Patented June 16, 1925.

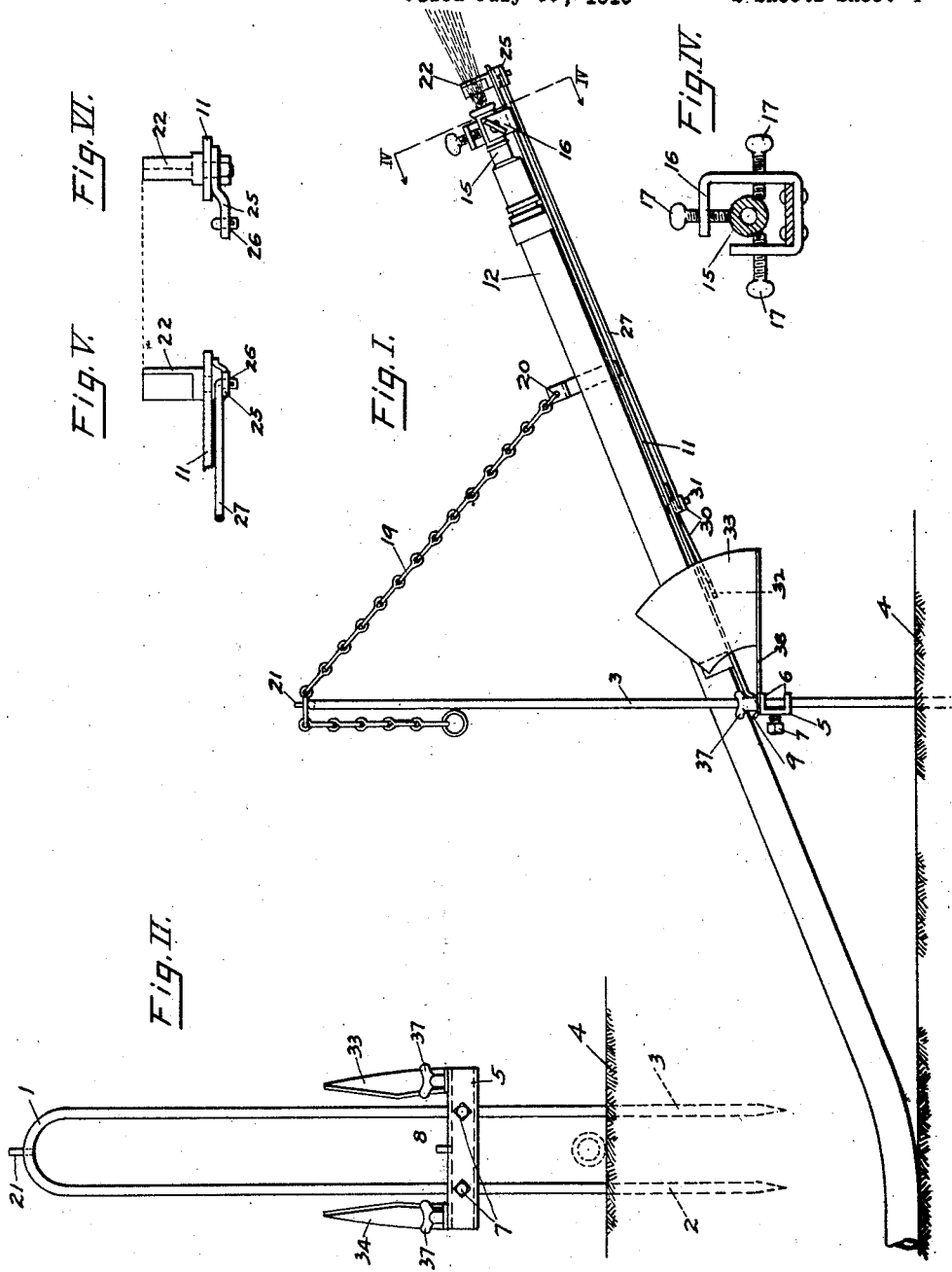

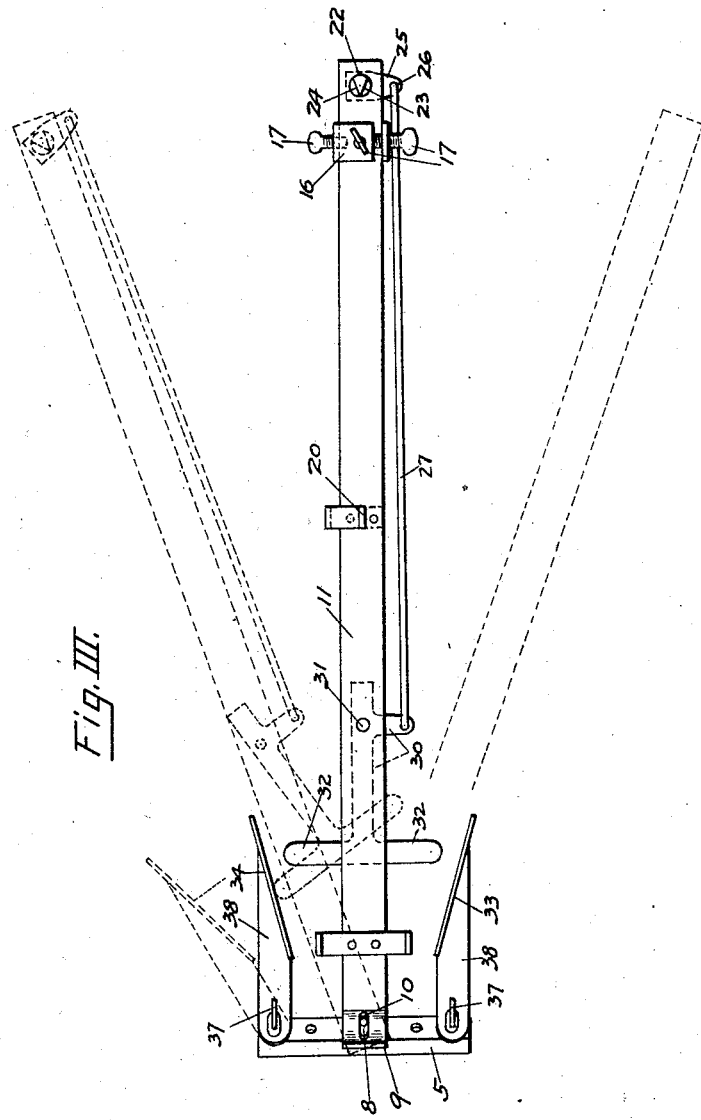

1,542,648

UNITED STATES PATENT OFFICE.

EDWIN E. THOMAS, OF PORTLAND, OREGON, ASSIGNOR OF ONE-HALF TO W. C. ALVORD, OF PORTLAND, OREGON.

LAWN SPRINKLER.

Application filed July 30, 1919. Serial No. 314,232.

*To all whom it may concern:*

Be it known that EDWIN E. THOMAS, a citizen of the United States of America, and resident of the city of Portland, in the county of Multnomah, in the State of Oregon, has invented certain new and useful Improvements in Lawn Sprinklers, of which the following is a specification, reference being had to the accompanying drawings.

My invention relates to lawn sprinklers, and has for its object the production of an automatically vibratory nozzle-supporting device which is reliable of operation and which is simple, durable, and economic of construction.

What constitutes my invention will be hereinafter specified in detail and succinctly set forth in the appended claims.

In the accompanying drawings:

Figure I is a side elevation of my invention in present preferred form of embodiment shown as planted in the ground and as supporting for operation a nozzle attached to the end of a hose.

Figure II is a rear elevation of the primary supporting frame.

Figure III is a top plan view of a portion of the subject matter of Figure I with the hose and nozzle omitted, showing in dotted lines operative changes of position of the hose carrier and adjustment of one of the striker-plates.

Figure IV is a detail view, in side elevation thereof, of the nozzle-adjusting holder.

Figure V is a detail view in side elevation as shown in Figure I and on slightly enlarged scale of the jet-actuated hose-carrier shifting stud.

Figure VI is an elevation of the same taken at right angles thereto looking towards the primary supporting frame.

Referring to the numerals on the drawings, 1 indicates a primary supporting frame that is preferably bifurcated and may be made of stiff wire bent to inversely U shape, and having terminally sharpened legs 2 and 3 adapted to be thrust endwise into the ground that is indicated by 4 in Figures I and II.

The frame 1 preferably carries a cross-bar 5 having apertured lugs 6, disposed in pairs, for the reception of the respective legs 2 and 3, and adjustable thereon as by abutment screws 7. The cross-bar 5 is also preferably provided midway between said legs with a pin 8. To said pin, as by engagement of a head 9 provided with an elongated slot 10 for its reception, is loosely secured a hose-carrier-arm 11 of any suitable length preferred. It is designed and adapted to support the otherwise free end of a hose 12 that terminates in a nozzle 15 of any usual or preferred form. Near its free end, the arm 11 is preferably provided with a parted loop 16 that is preferably made of a generally rectangular shape well shown in Figure IV. Said loop is preferably provided on three sides with abutment screws 17, one for each of said sides, whereby the nozzle 15 may be secured to the arm 11 and adjusted to desired disposition thereon.

The arm 11 is pendulously supported upon the frame 1 as by a chain 19 or other flexible member secured at one end, as at 20, to the carrier and whose loose end may be secured in lengths determinable at will as by a pin 21 preferably located on the top bend or arch of the frame 1 adapted to engage any open link or other aperture therein, as indicated in Figure I.

Substantially at the free end of the arm 11, is suitably mounted an oscillatory hose-carrier shifting-stud 22 having two preferably plain faces 23 and 24 which are preferably of wedge-shaped relative disposition, as best shown in Figure III. The stud 22, having the said preferably convergent faces 23 and 24, is actuated about its oscillatory axis by a water-jet discharged in service from the nozzle 15 against said faces alternately. When such a jet strikes the edge of the wedge formed by the faces 23 and 24, it is split by the wedge, but as often as it hits one face or the other with a preponderating force, it converts the side that is hit into a vane and causes the stud 22 to turn upon its axis. In order operatively to utilize the action last named of said stud, I prefer to provide upon the stud an arm 25 projecting therefrom radially to its pivotal axis and to that arm by a loose pivotal connection 26 unite one end of a rod 27, whose other end is in like manner connected to a bell crank lever 30, pivotally secured as indicated at 31, to the arm 11. In Figure III it will be noted that the rod 27 is arranged in close proximity to the edge of the hose carrying arm 11, and also to the loop 16, so that the rod, if moved far enough, will abut the loop 16 at times to limit the swinging movement of the lever 30 in both directions, and likewise the oscillating movement of the stud 22. The free end of the lever 30 carries a cross-head 32 whose ends are arcuated as shown, as the arm 11 is swung from side to side, strike alternately against striker-plates 33 and 34 carried by the frame 1 preferably upon the cross-bar 5. The connection between the said respective plates is preferably an adjustable one, obtained, for example, by wing nuts 37 threaded each to a stud-bolt extending through an aperture provided for its reception in a fin-bar 38 projecting from its respective striker-plate. The distance between the plates 33 and 34, obtained by their relative adjustment on the cross-bar 5, determines the operative swing of the arm 11.

It is to be particularly noted that the pivot point 31 of lever 30 is situated beyond or forwardly of the forward edges of the striker plates 33 and 34, whereby the lever 30 will always be swung toward the arm 11 when the arcuated ends of the cross-head 32 engage and slide upon the plates 33 and 34. In other words, the pivot 31 should be so situated with respect to the striker plates 33 and 34, that radial lines from the pivot 31 to the initial points of contact of the arcuate ends of crosshead 32 with the plates 33 and 34, define with said plates, angles of more than 90°. This arrangement is resorted to in order to prevent the crosshead 32 swinging to parallel the striker plates 33 and 34. The operation of my device may be briefly described as follows:

The frame 1, having been planted in the ground in the location selected, the nozzle 15 is, by the aid of the abutment screws 17, secured and properly centered within the loop 16 upon the arm 11. The angle of inclination of said arm with respect to the frame is then determined and fixed by the attachment to the pin 21 of the chain 19, the cross-bar 5 with its appurtenant striker-plates 33 and 34 being correspondingly adjusted and fixed upon the frame 1.

A jet issuing from the nozzle 15 will hit the stud 22 as it finds it. To function properly it must strike one of the stud faces 23 or 24 with preponderating force that will thereupon serve as a vane to the impact of the jet, and will cause the free end of the arm 11 carrying the nozzle 15 to swing upon the chain 19 to which it is pendulous, in one direction or the other, according to which of the said faces receives said impact. The swing of the arm 11, imparted in the manner just described, continues in one direction until the crosshead 32 impinges against that one of the striker-plates 33 or 34 which is disposed in the path of its movement. Thereupon, in consequence of said impingement, the lever 30 is caused to turn upon its pivot 31, thereby imparting through the rod 27 and radial arm 25 an oscillation to the stud 22, with the effect of presenting to impingement of the nozzle jet a change from a face 23 or 24, as the case may be, to the other of said faces. As soon as said change of faces takes place, the movement of the arm 11 is reversed and continues as above described until it in turn is reversed. The movement of the arm 11 in alternating directions continues automatically as long as a jet of sufficient force to operate it issues from the nozzle 15. It may be necessary to initiate, by manipulation, vibration of the arm 11, but after it is once set in motion no further attention is ordinarily required in order to effect its continued operation.

What I claim is:

1. In a lawn sprinkler, the combination with a supporting frame, and a vibratory hose-carrier-arm thereon, of means on the arm for securing a hose nozzle thereto, an oscillatory hose-carrier shifting-stud having two faces mounted near the end of said arm in the line of the nozzle-discharge, and automatic means made effective by the nozzle-discharge, for actuating said stud alternately to present the different faces of said stud to the nozzle-discharge with each swing of said arm, whereby it is made to vibrate so long as effective nozzle-discharge is maintained.

2. In a lawn sprinkler, the combination with a supporting frame, and a vibratory hose-carrier-arm thereon, of means on the arm for securing a hose nozzle thereto, an oscillatory hose-carrier shifting-stud having two faces mounted near the end of said arm in the line of the nozzle-discharge, and automatic means controllable by members fixed to the supporting frame, for actuating said stud alternately to present the different faces of said stud to the nozzle-discharge with each swing of said arm, whereby it is made to vibrate so long as effective nozzle discharge is maintained.

3. In a lawn sprinkler, the combination with a supporting frame, and a vibratory hose-carrier-arm thereon, of means on the arm for securing a hose nozzle thereto, an oscillatory hose-carrier shifting-stud having two faces mounted near the end of said arm in the line of the nozzle discharge, a radially projecting arm upon the stud, a bell-crank lever pivoted to the hose-carrier-arm, a rod operatively connecting said radially projecting arm and one end of said lever, and striker-plates on the supporting frame in the path of the movement of said cross-head effected by the swing of the hose-carrier-arm adapted to actuate said lever and thereby to actuate said stud, substantially for the purpose specified.

4. In a lawn sprinkler, the combination with a supporting frame, and a vibratory hose-carrier-arm thereon, of means on the arm for securing a hose nozzle thereto, an oscillatory hose-carrier shifting-stud having two faces mounted near the end of said arm in the line of the nozzle-discharge, a radially projecting arm upon the stud, a bell-crank lever pivoted to the hose-carrier-arm, a rod operatively connecting said radially projecting arm and one end of said lever, and striker-plates on the supporting frame in the path of the movement of said cross-head effected by the swing of the hose-carrier-arm adapted to actuate said lever and thereby to actuate said stud, substantially for the purpose specified, said plates being adjustable to and from each other so as to limit the vibration of the hose-carrier-arm.

5. In a device of the kind described, including a supporting frame, a vibratory hose-carrier-arm, an oscillating hose-carrier shifting-stud thereon, and a cross-headed bell-crank lever also thereon operatively connected with said stud, of a cross-bar vertically adjustable on the supporting frame, and striker-plates carried on said cross-bar, operatively disposed with respect to the cross-head of said lever.

6. In a device of the kind described, the combination with a bifurcated supporting frame, a vibratory hose-carrier-arm carried between the legs thereof, and automatic means for vibrating said arm, of means for pendulously supporting said arm on said frame.

7. In a device of the kind described, the combination with a bifurcated supporting frame, a vibratory hose-carrier-arm carried between the legs thereof, and automatic adjustable means for vibrating said arm, of adjustable means for pendulously supporting said arm on said frame at any desired angle of inclination.

8. In a device of the kind described, the combination with a bifurcated supporting frame, of a vibratory hose-carrier-arm pendulously supported on said frame, a loop on said arm adapted to receive a nozzle, said loop being provided with three abutment screws adapted to effect an adjustable support for a nozzle therein, and a wedge-shaped stud operatively disposed in the line of discharge from said nozzle.

9. In a device of the kind described, comprising a supporting frame and a vibratory hose-carrier-arm thereon, of means for imparting vibratory movement to said arm, comprising an oscillatory stud having two faces operatively disposed in the line of nozzle-discharge from a hose secured to said arm.

10. In a device of the kind described, comprising a supporting frame and a vibratory hose-carrier-arm thereon, of means for imparting vibratory movement to said arm, comprising an oscillatory stud having two faces, of wedge shaped relative disposition, operatively disposed in the line of nozzle-discharge from a hose secured to said arm.

In testimony whereof, I have hereunto set my hand in the presence of two subscribing witnesses.

EDWIN E. THOMAS.

Witnesses:
 JOSEPH L. ATKINS,
 L. B. ATKINS.